United States Patent
Gramann et al.

(10) Patent No.: US 11,218,039 B2
(45) Date of Patent: Jan. 4, 2022

(54) ELECTRIC MOTOR WITH SWITCHOVER ELEMENTS IN THE MAGNETIC CIRCUIT

(71) Applicant: Schaeffler Technologies AG & Co. KG, Herzogenaurach (DE)

(72) Inventors: Matthias Gramann, Renchen (DE); Wolfgang Reik, Bühl (DE); Miriam Engler, Bühl (DE); Peter Schwanemann, Bühl (DE); Carsten Angrick, Appenweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 172 days.

(21) Appl. No.: 16/492,764

(22) PCT Filed: Feb. 28, 2018

(86) PCT No.: PCT/DE2018/100176
§ 371 (c)(1),
(2) Date: Sep. 10, 2019

(87) PCT Pub. No.: WO2018/177457
PCT Pub. Date: Oct. 4, 2018

(65) Prior Publication Data
US 2020/0076253 A1      Mar. 5, 2020

(30) Foreign Application Priority Data

Mar. 30, 2017   (DE) .......................... 102017106828.7

(51) Int. Cl.
*H02K 1/27* (2006.01)
*H02K 21/02* (2006.01)

(52) U.S. Cl.
CPC ......... *H02K 1/2766* (2013.01); *H02K 1/2786* (2013.01); *H02K 21/025* (2013.01); *H02K 21/029* (2013.01); *H02K 2213/09* (2013.01)

(58) Field of Classification Search
CPC .. H02K 1/2766; H02K 1/2786; H02K 21/025; H02K 21/029; H02K 2213/09
See application file for complete search history.

(56) References Cited

U.S. PATENT DOCUMENTS

| 2002/0093262 A1 | 7/2002 | Zepp et al. |
| 2006/0091752 A1 | 5/2006 | Adaniya et al. |
| (Continued) | | |

FOREIGN PATENT DOCUMENTS

| CN | 102055292 A | 5/2011 |
| DE | 2211366 A1 | 9/1973 |
| (Continued) | | |

OTHER PUBLICATIONS

Machine Translation, Yabumoto, JP-2004222350-A, Aug. 2004. (Year: 2004).*

*Primary Examiner* — Thomas Truong
(74) *Attorney, Agent, or Firm* — Kevin L. Parks

(57) ABSTRACT

An internal rotor for an electric machine includes a rotational axis, an outer circumferential face which delimits the internal rotor, a pole arrangement comprising a centroid, and an actuating mechanism for moving the pole arrangement towards the rotational axis or away from the rotational axis to set a first spacing between the outer circumferential face and the centroid. In an example embodiment, the actuating mechanism has an actuator for moving the pole arrangement. The actuator has a hydraulically operable piston, a pneumatically operable piston, an electric motor actuator, or converts an axial force to a radial force. In an example embodiment, the actuating mechanism is operatively connected to the pole arrangement. The actuating mechanism is arranged between the rotational axis and the pole arrangement, or the actuating mechanism is arranged between the outer circumferential face and the pole arrangement.

14 Claims, 3 Drawing Sheets

(56) References Cited

U.S. PATENT DOCUMENTS

| | | |
|---|---|---|
| 2009/0026864 A1 | 1/2009 | Ichiyama |
| 2011/0101812 A1 | 5/2011 | Finkle et al. |
| 2017/0163108 A1* | 6/2017 | Schencke ............ H02K 21/028 |

FOREIGN PATENT DOCUMENTS

| | | | | |
|---|---|---|---|---|
| DE | 102005015657 A1 | | 10/2006 | |
| DE | 102014206342 A1 | | 10/2015 | |
| DE | 102014212871 A1 | | 1/2016 | |
| EP | 2985893 A1 | | 2/2016 | |
| GB | 1425113 A | | 2/1976 | |
| JP | H07288940 A | | 10/1995 | |
| JP | 2002112474 A | | 4/2002 | |
| JP | 2002325412 A | | 11/2002 | |
| JP | 2004222350 A | * | 8/2004 | ............ H02K 1/276 |
| JP | 2004222350 A | | 8/2004 | |
| JP | 2005261119 A | | 9/2005 | |
| JP | 2006014466 A | | 1/2006 | |
| JP | 2007244063 A | | 9/2007 | |
| JP | 2009050068 A | | 3/2009 | |

* cited by examiner

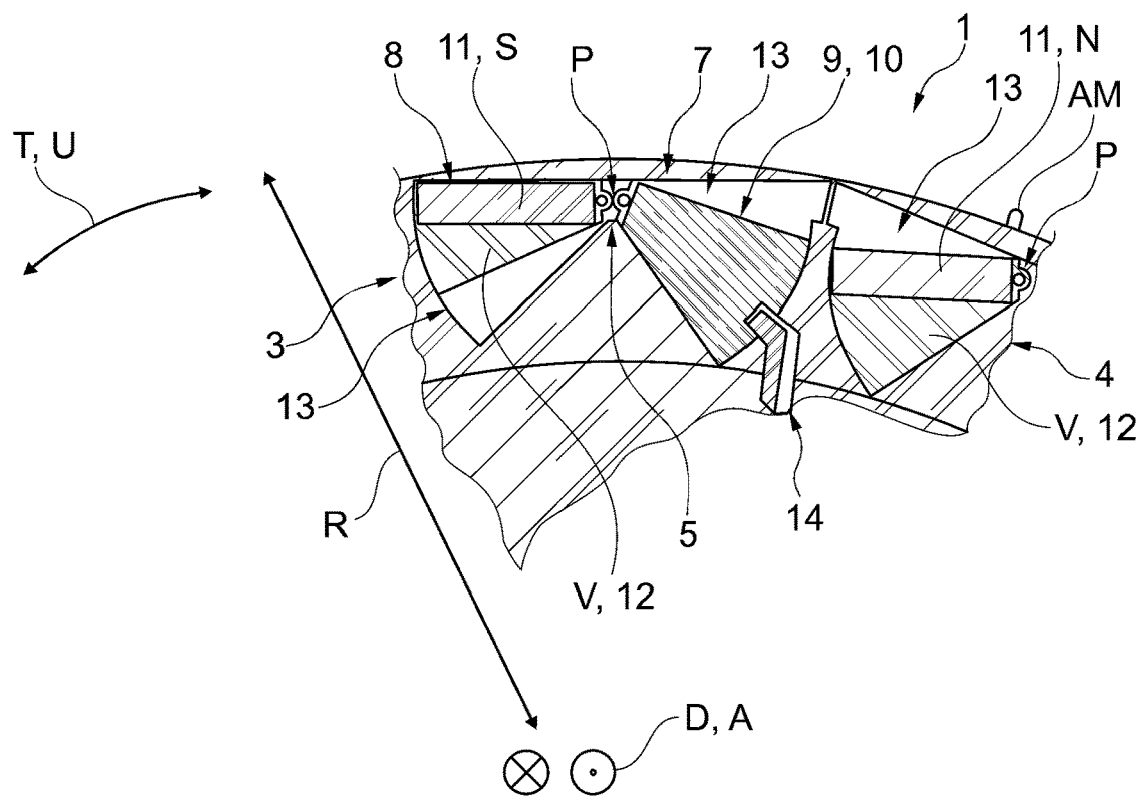

ELECTRIC MOTOR WITH SWITCHOVER ELEMENTS IN THE MAGNETIC CIRCUIT

CROSS-REFERENCE TO RELATED APPLICATIONS

This application is the United States National Phase of PCT Appln. No. PCT/DE2018/100176 filed Feb. 28, 2018, which claims priority to German Application No. DE102017106828.7 filed Mar. 30, 2017, the entire disclosures of which are incorporated by reference herein.

TECHNICAL FIELD

The invention relates to a rotor of an electric machine which is configured as an internal rotor, and to an electric machine having a rotor.

BACKGROUND

Various refinements of radial, transverse and axial flux machines are known from the prior art. For instance, EP 2 985 893 A1 discloses an axial flux synchronous machine for the active air gap adjustment between the rotor and the stator. Furthermore, US 2006/091752 A1 discloses a passive adjustment of the air gap between the rotor and the stator in the case of external rotor radial flux synchronous machines. Shown generally, the presented prior art aims at a reduction of losses and an increase in the degree of efficiency.

SUMMARY

According to the disclosure, a rotor, for example a rotor of an electric machine which is configured as an internal rotor, includes a rotational axis which extends in the axial direction and about which the rotor can be rotated. The rotor may have an outer circumferential face which delimits the rotor, and at least one pole arrangement. Furthermore, the rotor may include an actuating mechanism for the at least one pole arrangement.

The actuating mechanism is may be configured in such a way that the spacing between the outer circumferential face of the rotor and a centroid of the at least one pole arrangement can be set. As a result, the at least one pole arrangement can be moved to the inside toward the rotational axis of the rotor or to the outside away from the rotational axis of the rotor. In other words, the at least one pole arrangement can be moved in the radial direction by means of the actuating mechanism.

The centroid of the at least one pole arrangement may be arranged in a plane which, starting from the rotational axis, is defined in the radial and tangential direction of the rotor. The centroid of the at least one pole arrangement may also be formed by a centroid of a unit which may be composed of a magnetic rotor body and/or a magnetizable rotor body. The actuating mechanism may include an actuator for moving the at least one pole arrangement. The actuating mechanism may include a hydraulically or pneumatically operable actuator, e.g., a piston. The actuating mechanism may also include an electric actuator, e.g., an electric motor.

The actuator may be configured as a linear drive or as a rotary drive. The actuating mechanism may include an actuating device which may convert a mechanical force which acts in the axial direction into a force with a radial direction. In this way, for example, the force of a release bearing can be utilized for the actuating mechanism. The actuating mechanism may be operatively connected to the at least one pole arrangement, in order to move the pole arrangement.

The actuating mechanism may be arranged between the rotational axis and the at least one pole arrangement which may be spaced apart from the rotational axis in the radial direction. The actuating mechanism may also be arranged between the outer circumferential face and the at least one pole arrangement which may be spaced apart from the outer circumferential face in the radial direction.

The actuating mechanism may include an elastic element, e.g., a spring or a rubber element, which counteracts an actuator of the actuating mechanism. As a result, the at least one pole arrangement can be reset counter to the direction of action of the actuator. Furthermore, the actuator and the elastic element may be arranged on opposite sides of the at least one pole arrangement. In this way, they can act in directions which are directed counter to one another.

The actuating mechanism may include a pivot point, about which the at least one pole arrangement can be pivoted. The actuating mechanism may include a lever arrangement, with the aid of which the at least one pole arrangement can be moved or can be pivoted. Furthermore, the lever arrangement may include one or two lever arms. A first lever arm may connect the pivot point to a rotor body of the at least one pole arrangement. Furthermore, a second lever arm may connect the pivot point to a lever mass which can be accelerated. The first and/or second lever arm can be formed by a pole arrangement or its rotor body. The lever arm may have a length which runs from a center of gravity to a pivot point.

The length of the lever arms, the mass of the rotor body of the at least one pole arrangement, and the lever mass which can be accelerated are may be adapted to one another in such a way that, when a definable rotational speed of the rotor is reached, the lever mass is moved to the outside away from the rotational axis or to the inside toward the rotational axis. Here, the rotor body of the at least one pole arrangement may be moved via the pivot point in the opposite direction to the lever mass.

It is also advantageous the actuating mechanism may include a force transmission device, for example a release bearing, and an actuating device which moves the at least one pole arrangement. The actuating device can be activated via the force which acts from the force transmission device, as a result of which the at least one pole arrangement can be moved.

The rotor may have at least one locking device for the at least one pole arrangement, the locking device including at least a first and a second actuating position. The first and/or second actuating position can lock the at least one pole arrangement at a first and/or second distance or at a first and/or second spacing from the rotational axis. The magnitudes of the first and second distance or the first and second spacing may be different than one another. In the present description, the term of the spacing of the at least one pole arrangement or its rotor bodies from the rotational axis is understood to mean the spacing between the center of gravity or centroid and the rotational axis.

Furthermore, it can be provided that the at least one pole arrangement includes a magnetic and/or magnetizable pole. The at least one pole arrangement may include a first pole (for example, north pole or south pole) and/or a second pole (for example, south pole or north pole). Furthermore, pole arrangements with different magnetic poles may alternate in the circumferential direction of the rotor. The at least one pole arrangement can include at least one magnetic rotor body, for example a permanent magnet, and/or one magnetizable rotor body, for example a laminated core. Furthermore, the at least one magnetic and/or magnetizable rotor body may be of cuboid, for example rod-shaped, configuration, in particular in cross section. A cross section is a plane which is formed by the radial and tangential direction of the rotor.

The at least one pole arrangement may includes at least two magnetic and/or magnetizable rotor bodies which form a V-shaped arrangement or a spoke arrangement or are embedded in a flat manner into the rotor. The rotor can provide one cutout per pole arrangement, for example one cutout per rotor body, at least one magnetic and/or one magnetizable rotor body arranged within the cutout. The cutout within the rotor may be configured as a circle segment or as a rectangle in cross section, in order to provide a pole arrangement with space for movement, for example in the radial direction.

A second aspect of the present disclosure includes an electric machine, for example an internal rotor radial flux machine, having a rotor and a stator. It is expressly noted that the features of the rotor, for example the rotor of an electric machine which is configured as an internal rotor, as are mentioned under the first aspect, can be used individually or in a manner which is combined with one another in the electric machine. In other words, the features mentioned above under the first aspect of the invention relating to the rotor can also be combined here with further features under the second aspect of the invention.

An electric machine includes a rotor which comprises features of the first aspect of the present disclosure, and a stator which surrounds the rotor. The rotor and the stator can be spaced apart from one another in the radial direction, in order to form an air gap between the two. Furthermore, the electric machine may include a rotational axis, about which the rotor can be rotated. In this way, a relative movement of the two with respect to one another can be ensured.

The rotor may have an outer circumferential face which delimits the rotor. The rotor may include at least one pole arrangement and an actuating mechanism for the at least one pole arrangement. The stator may include an inner circumferential face. The actuating mechanism may be configured in such a way that the spacing between a centroid of the at least one pole arrangement and the stator, for example its inner circumferential face, can be set. As a result, the at least one pole arrangement can be moved to the inside toward the rotational axis of the electric machine or to the outside away from the rotational axis of the electric machine.

Furthermore, the centroid of the at least one pole arrangement may be arranged in a plane which, starting from the rotational axis, is defined in the radial and tangential direction of the rotor. Furthermore, the stator may include at least one stator pole arrangement for generating a magnetic field. Here, the at least one stator pole arrangement includes a stator tooth with windings. The windings can be energized in different ways, with the result that different magnetic poles or even no magnetic pole can be generated in a stator tooth.

The rotor can have at least one locking device for the at least one pole arrangement. The locking device can include at least a first and a second actuating position. Furthermore, the actuating positions can lock the at least one pole arrangement at different distances from the rotational axis.

An opposing electromagnetic field to the electromagnetic field of the at least one pole arrangement of the rotor can be generated by the at least one stator pole arrangement within a definable time interval. As a result, it is possible, after the release of the locked pole arrangement in the first actuating position, to make a displacement of the pole arrangement in accordance with the forces which are generated by the electromagnetic fields possible and to lock it at the second actuating position.

Shown in a simplified manner, this concept may relate to the design of a rotor for a synchronous machine in external or internal rotor technology, e.g., consisting of a three-phase or multiple-phase three-phase stator and a permanent magnet rotor. The disclosure can relate to all fields of application of rotating electric machines. The disclosure may be advantageous for applications, in which the rotating electric machine is operated over great torque and rotational speed ranges, for example (but not exclusively) as a traction machine of an electrically operated automobile.

Here, the disclosure describes a manner of further optimizing an electric machine, in particular but not exclusively to a wide rotational speed and torque range. This optimization aims at the optimization of an electric machine in order to improve efficiency and costs. Whereas the geometric air gap between the rotor and the stator can remain constant in the case of the disclosed device, the effective magnetic air gap can be adapted by way of foldable elements and/or by way of an actuating mechanism for at least one pole arrangement in the rotor.

The foldable elements in the rotor and/or the actuating mechanism for at least the pole arrangement may have either laminated core elements or a magnetizable pole, permanent magnets or a magnetic pole, or a combination of the two. The position of the foldable elements can be changed during operation, with the result that the electric and magnetic properties of the electric machine can be adapted during operation to the respective operating strategy. In this way, losses during operation can be reduced and, as a result, the degree of efficiency of the machine can be increased. Furthermore, induced voltages at high rotational speeds can be reduced. As a result, overvoltages and damage based on them of the power electronics used for operating the machine can be prevented as a consequence.

The rotor or the rotor topology may have permanent magnets which are embedded in a flat manner, in a V-shape or in a spoke arrangement. The effective air gap is enlarged by way of folding over of a sheet metal element, a magnet or a combined element or at least one pole arrangement. Centrifugal forces may act on the at least one pole arrangement or the actuating mechanism or on the foldable element either directly or on a lever arrangement which is fastened to the element to be folded or the at least one pole arrangement.

The actuating mechanism may be activated by way of an external actuator system (electrically, hydraulically, by way of deflection of the force of a release bearing, etc.). The actuating mechanism may be activated by way of deliberate application of an opposing field in the stator, in order to reduce the magnetic forces in the rotor, and the simultaneous opening of a locking means.

BRIEF DESCRIPTION OF THE DRAWINGS

In the following text, the disclosure will be described in greater detail on the basis of one exemplary embodiment in conjunction with associated drawings, in which, diagrammatically:

FIG. 3 shows a sectional view of a rotor according to the disclosure with one exemplary embodiment of an actuating mechanism of the rotor, FIG. 4 shows a sectional view of a rotor according to the disclosure with a further exemplary embodiment of an actuating mechanism of the rotor.

DETAILED DESCRIPTION

Figure 1:
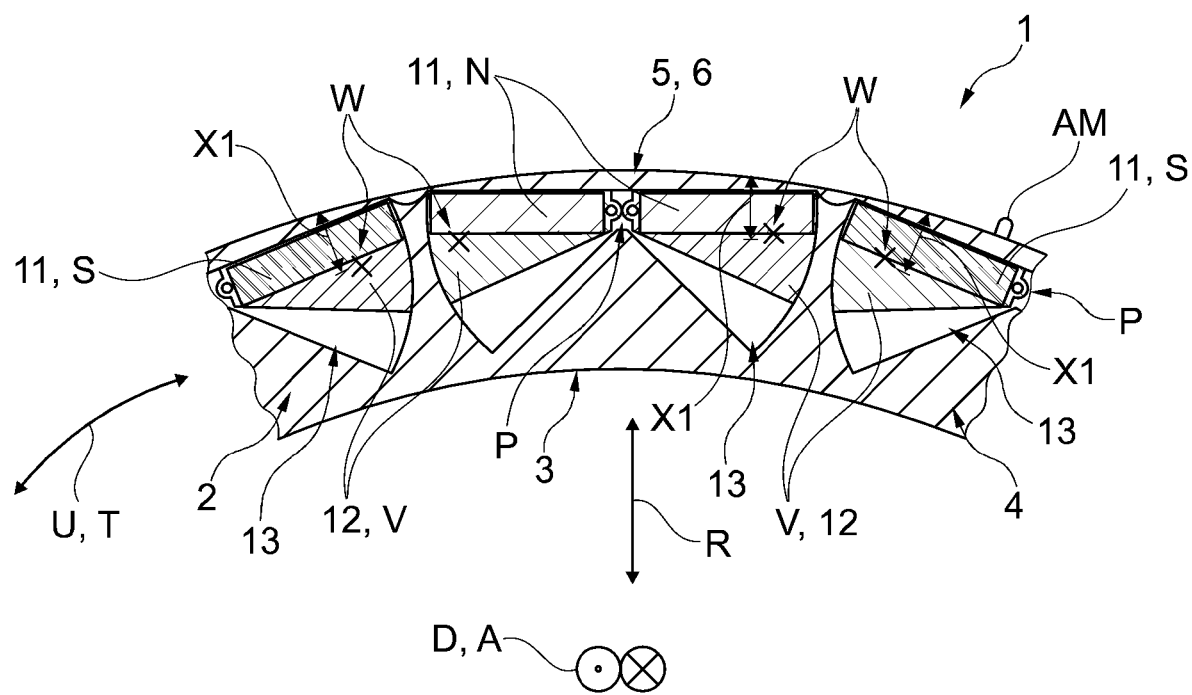
FIG. 1 shows a sectional view of a rotor according to the disclosure in a first state.
Figure 5:
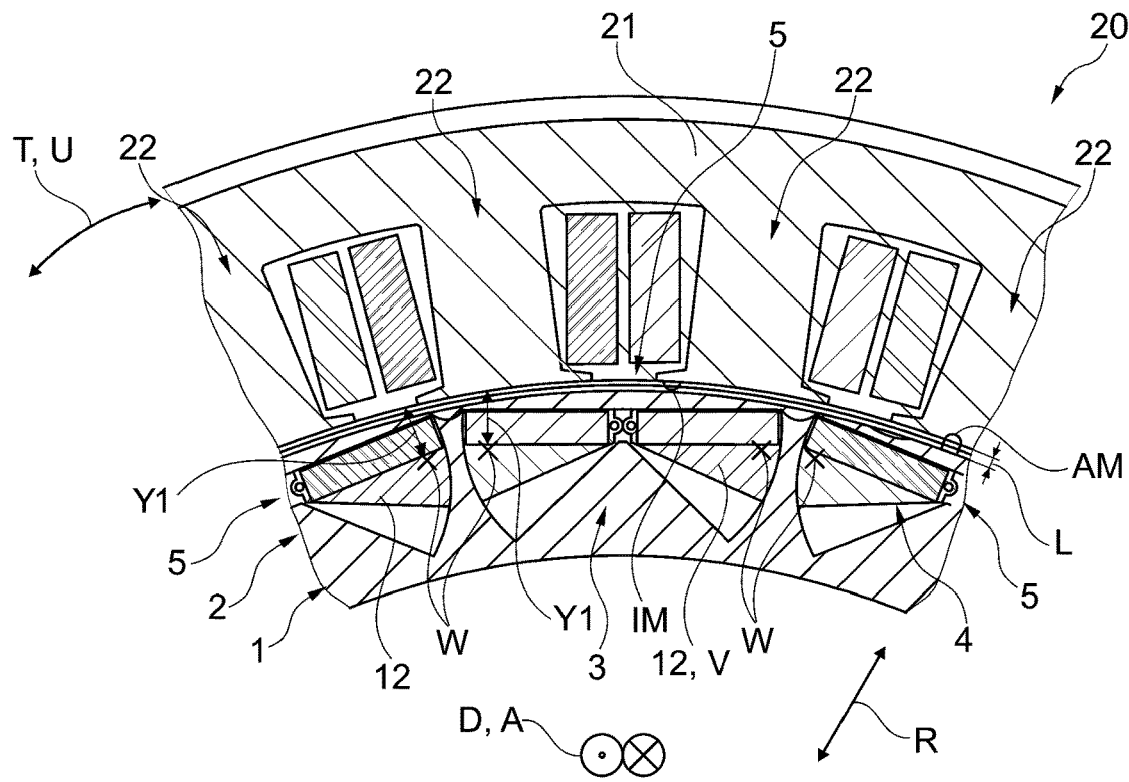
FIG. 5 shows a sectional view of an electric machine according to the disclosure with a rotor and a stator in a first state.

In the following description, identical designations are used for identical objects. FIG. 1 shows a sectional view of a rotor 1 according to the disclosure in a first state. More precisely depicted, FIG. 1 shows a rotor 1 of an electric machine 20 (ref. FIG. 5/6) which is configured as an internal rotor. Here, the rotor 1 comprises a rotational axis D which extends in the axial direction A and about which the rotor 1 can be rotated. The rotational axis D and the axial direction A lie perpendicularly on the plane of the drawing which is shown; as it were, the rotational axis D and the axial direction A extend out of the plane of the drawing or into the plane of the drawing. Furthermore, the rotor 1 comprises an outer circumferential face AM which delimits the rotor 1.

Furthermore, the rotor 1 has various pole arrangements, of which three pole arrangements 2, 3, 4 are shown in the illustrated detail of FIG. 1. Each of the pole arrangements 2, 3, 4 comprises a magnetic and a magnetizable pole N, V or S, V, the pole arrangements 2, 4 having a first pole N (north pole), and the pole arrangement 3 having a second pole S (south pole). Here, pole arrangements with different magnetic poles or the pole arrangement 2, 4 and the pole arrangement 3 alternate in the circumferential direction U or in the tangential direction T of the rotor 1. More specifically depicted, each pole arrangement 2, 3, 4 has one or two magnetic and magnetizable rotor bodies 11, 12. Here, the rotor body 11 is configured as a permanent magnet 11 with a corresponding pole N, S, and the rotor body 12 is configured as a magnetizable laminated core 12.

Each magnetic rotor body 11 is of cuboid configuration in cross section, each magnetizable rotor body 12 being configured as a circle segment in cross section. Even more precisely depicted, the pole arrangements 2, 4 and the pole arrangement 3 in each case comprise two magnetic and magnetizable rotor bodies 11, 12. Here, each pole arrangement forms, with two magnetic and magnetizable rotor bodies, a V-shaped arrangement or an upside-down V-shaped arrangement.

Furthermore, the rotor 1 provides one cutout 13 per pole arrangement 2, 3, 4 or one cutout 13 per rotor body 11, 12. In each case one magnetic rotor body and one magnetizable rotor body 11, 12 are arranged within the cutout 13, the cutout 13 within the rotor 1 being configured as a circle segment in cross section, in order to give a pole arrangement 2, 3, 4 space for movement in the tangential direction T and the radial direction R.

The rotor 1 also has an actuating mechanism 5 for each pole arrangement 2, 3, 4 or for their rotor bodies 11, 12. Furthermore, an actuating mechanism 5 is operatively connected to a pole arrangement 2, 3, 4, in order to move the pole arrangement. Here, each actuating mechanism 5 has a pivot point P, about which the corresponding pole arrangement 2, 3, 4 can be pivoted. Each actuating mechanism 5 comprises an electric actuator 6 for moving a pole arrangement 2, 3, 4. The electric actuator 6 is realized in the embodiment according to FIG. 1 as an electric rotary drive or rotary motor which is arranged at the pivot point P and can move the rotor bodies 11, 12 (permanent magnets 11 and laminated cores 12). Summarized roughly, the actuating mechanism 5 in FIG. 1 is configured in such a way that the spacing X1, X2 between the outer circumferential face AM of the rotor 1 and the centroid W of each pole arrangement 2, 3, 4 can be set, as a result of which the pole arrangements 2, 3, 4 can be moved to the inside toward the rotational axis D of the rotor 1 or to the outside away from the rotational axis D of the rotor 1.

More precisely depicted, the centroid W of a pole arrangement 2, 3, 4 is the centroid of a unit which is formed by a magnetic rotor body 11 and a magnetizable rotor body 12. Furthermore, the pole arrangements 2, 3, 4 are positioned and/or moved in FIG. 1 in such a way that their centroids W or the centroids W of the rotor bodies 11, 12 are positioned closest to the outer circumferential face AM. In other words, the spacing X1 between the outer circumferential face AM of the rotor 1 and the respective centroid W of the respective pole arrangement 2, 3, 4 is lowest or smallest in the first state which is shown according to FIG. 1.

Figure 2:
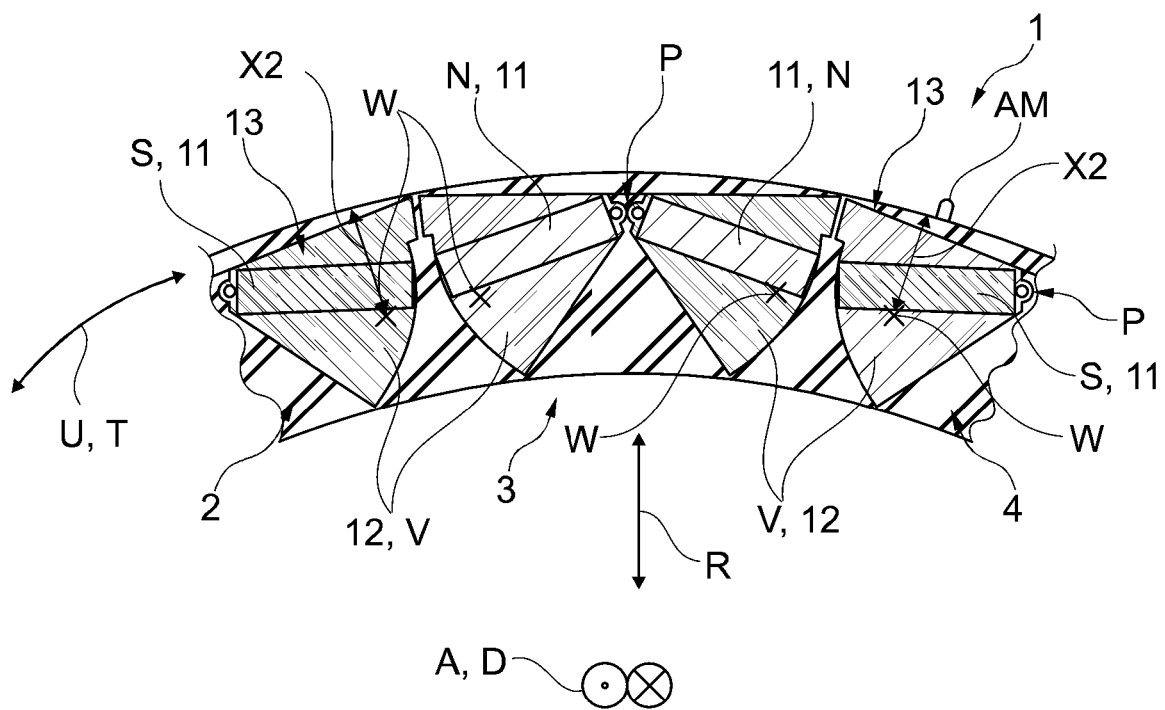
FIG. 2 shows a sectional view of a rotor according to the disclosure in a second state.

FIG. 2 shows a sectional view of a rotor 1 according to the disclosure in a second state. As can be seen readily in the case of a comparison of FIGS. 1 and 2, they are substantially identical. Therefore, in order to avoid unnecessary repetitions, reference is made to the comments with respect to FIG. 1 which can be applied here analogously to FIG. 2. In the following text, merely the differences between FIGS. 1 and 2 will be described.

It is first of all to be noted in the case of a comparison of FIGS. 1 and 2 that, in FIG. 1, the spacing X1 between the outer circumferential face AM of the rotor 1 and the centroid W of each pole arrangement 2, 3, 4 or their rotor bodies 11, 12 is set. To this end, the pole arrangements 2, 3, 4 have been moved to the outside away from the rotational axis D of the rotor 1 with the aid of the actuating mechanisms 5 or their actuators 6.

In FIG. 2, in contrast, the spacing X2 between the outer circumferential face AM of the rotor 1 and the centroid W of each pole arrangement 2, 3, 4 or their rotor bodies 11, 12 is set. It can be seen clearly in the case of a direct comparison of the two figures that the spacing X2 from FIG. 2 is greater than the spacing X1 from FIG. 1. Accordingly, the actuating mechanism 5 has set the spacing X2 between the outer circumferential face AM of the rotor 1 and the centroid W of each pole arrangement 2, 3, 4 in such a way that the pole arrangements 2, 3, 4 have been moved to the inside toward the rotational axis D of the rotor 1. In other words, the pole arrangements 2, 3, 4 have been moved in the radial direction R to the inside toward the rotational axis D.

Although not shown in FIG. 1 or 2, it is noted that it is possible that the actuating mechanism 5 can comprise an elastic element, in particular a spring or a rubber element, which counteracts an actuator 6 of the actuating mechanism 5. As a result, the pole arrangements 2, 3, 4 can be reset counter to the direction of action of the actuator 6. Here, the actuator 6 and the elastic element are preferably arranged on opposite sides of a pole arrangement 2, 3, 4.

FIG. 3 shows a sectional view of a rotor 1 according to the disclosure with one exemplary embodiment of an actuating mechanism 5 of the rotor 1. On account of the high similarity of FIG. 3 to FIGS. 1 and 2, in order to avoid unnecessary repetitions, reference is made to the comments there with respect to FIGS. 1 and 2 which can be applied here analogously to FIG. 3. In the following text, merely the differences of FIG. 3 to FIGS. 1 and 2 will be described.

As FIG. 3 shows, the actuating mechanism 5 comprises a pivot point P, about which the pole arrangement 3 can be pivoted. Here, the actuating mechanism 5 has a lever arrangement 7 with two lever arms 8, 9 or with a first lever arm 8 and a second lever arm 9, with the aid of which the pole arrangement 3 can be pivoted. The first lever arm 8 connects the pivot point P to the rotor body 11, 12 of the pole arrangement 3 or to its center of gravity, the second lever arm 9 connecting the pivot point P to a lever mass 10 which can be accelerated or to its center of gravity. The length of the lever arms 8, 9, the mass of the rotor bodies 11, 12 of the pole arrangement 3, and the lever mass 10 which can be accelerated are adapted to one another in such a way that, when a definable rotational speed of the rotor 1 is reached, the lever mass 10 is moved to the outside away from the rotational axis D. Here, the rotor bodies 11, 12 of the pole arrangement 3 are moved via the pivot point P in the opposite direction to the lever mass 10.

Furthermore, the rotor 1 according to FIG. 3 has a locking device 14 for the pole arrangement 3, the locking device 14 having a first and a second actuating position. FIG. 3 shows the locking device 14 in the first actuating position, in which the pole arrangement 3 or its rotor bodies 11, 12 is/are locked at a first distance from the rotational axis D. In order to then permit pivoting or rotating about the pivot point P, the locking device 14 is moved into the second actuating position, in which the lever mass 10 which can be accelerated is released or in which the lever mass 10 which can be accelerated can be moved freely. As a result, the pole arrangement 3 or its rotor bodies 11, 12 pivots/pivot about the pivot point P (ideally counter to the clockwise direction) in such a way that the pole arrangement 3 or the rotor bodies 11, 12 is/are locked by means of the lever mass 10 at a second distance from the rotational axis D.

FIG. 4 shows a sectional view of a rotor 1 according to the disclosure with a further exemplary embodiment of an actuating mechanism 5 of the rotor 1. On account of the similarity of FIG. 4 to FIGS. 1 to 3, in order to avoid unnecessary repetitions, reference is made to the comments with respect to FIGS. 1 to 3 which can be applied analogously to FIG. 4. In the following text, the differences of FIG. 4 from FIGS. 1 to 3 will be described.

For instance, the rotor 1 according to FIG. 4 likewise has an actuating mechanism 5, but the latter is realized by way of a hydraulically or pneumatically operable actuator 6, in particular in the embodiment of a piston. Here, the actuating mechanism 5 is arranged between the rotational axis D and the pole arrangement 3 which is spaced apart from the rotational axis D in the radial direction R. As an alternative, it is also possible to arrange the actuating mechanism 5 between the outer circumferential face AM and the pole arrangement 3 which is then ideally spaced apart from the outer circumferential face AM in the radial direction R.

A separate locking device 14 (as shown in FIG. 3) is not necessary in the case of the use of a hydraulically or pneumatically operable actuator 6, since the latter can take over said function itself. Accordingly, not only can a first and a second actuating position be realized with the aid of a hydraulically or pneumatically operable actuator 6, but rather also various actuating positions at various distances from the rotational axis D for the pole arrangement 3. The distance of the pole arrangement 3 or its rotor bodies 11, 12 from the rotational axis D is to be understood to mean the spacing between the center of gravity or centroid W and the rotational axis D.

As an alternative to the actuator 6 according to FIG. 4, it is possible that the actuating mechanism 5 comprises an actuating device (not shown) which converts a mechanical force which acts in the axial direction A into a force with a radial direction R. Said force is then capable, for example, of moving the pole arrangement 3 with the aid of a force transmission device, for example configured as a release bearing.

FIG. 5 shows a sectional view of an electric machine 20 according to the disclosure with a rotor 1 and a stator 21 in a first state. The electric machine 20 has a rotor 1 according to FIGS. 1 and 2, and a stator 21 which surrounds the rotor 1. The stator 21 has an inner circumferential face IM.

According to FIG. 5, the rotor 1 and the stator 21 are spaced apart from one another in the radial direction R, in order to form an air gap L between the two. Furthermore, the electric machine 20 comprises a rotational axis D, about which the rotor 1 can be rotated, the rotor 1 having an outer circumferential face AM which delimits it. The rotor 1 comprises the pole arrangements 2, 3, 4 and an actuating mechanism 5 for each pole arrangement 2, 3, 4. The actuating mechanism 5 or each actuating mechanism 5 is configured in such a way that the spacing Y1, Y2 between a centroid W of the pole arrangements 2, 3, 4 and the stator 21 or its inner circumferential face IM can be set. As a result, the pole arrangements 2, 3, 4 can be moved to the inside toward the rotational axis D of the electric machine 20 or to the outside away from the rotational axis D of the electric machine 20.

In FIG. 5, the pole arrangements 2, 3, 4 are positioned or moved in such a way that their centroids W are positioned closest to the outer circumferential face AM or to the stator 21. In other words, the spacing Y1 between the respective centroid W of the respective pole arrangement 2, 3, 4 or the rotor bodies 11, 12 and the stator 21 or its inner circumferential face IM is lowest or smallest in the first state which is shown according to FIG. 5.

Figure 6:
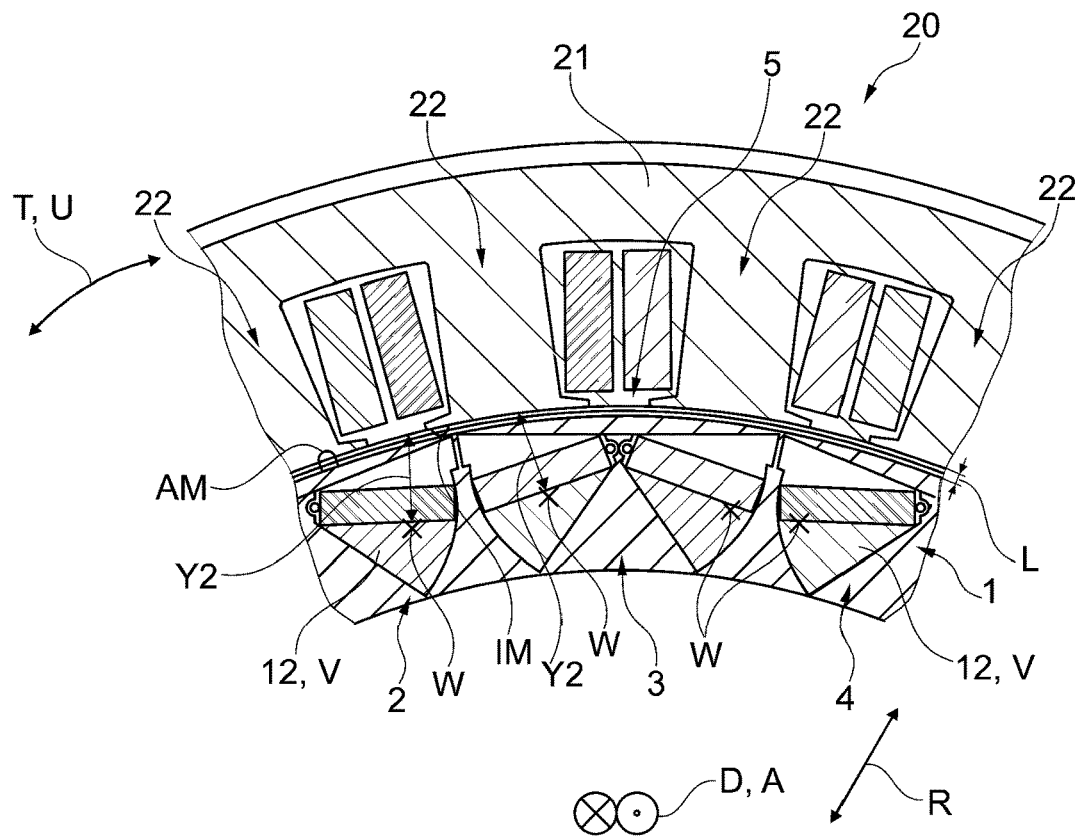
FIG. 6 shows a sectional view of an electric machine according to the disclosure with a rotor and a stator in a second state.

FIG. 6 shows a sectional view of an electric machine 20 according to the disclosure with the rotor 1 and the stator 21 from FIG. 5 in a second state. As can be seen clearly in the case of a comparison of FIGS. 5 and 6, they are substantially identical. Therefore, in order to avoid unnecessary repetitions, reference is made to the comments with respect to FIG. 5 which can be applied analogously here. In the following text, merely the differences between FIG. 5 and FIG. 6 will be described.

First of all, it is to be noted in the case of a comparison of FIGS. 5 and 6 that, in FIG. 5, the spacing Y1 between the outer circumferential face AM of the rotor 1 and the centroid W of each pole arrangement 2, 3, 4 or the rotor bodies 11, 12 is set. To this end, the pole arrangements 2, 3, 4 have been moved to the outside away from the rotational axis D of the rotor 1 with the aid of the actuating mechanisms 5.

In FIG. 6, in contrast, the spacing Y2 between the respective centroid W of the respective pole arrangement 2, 3, 4 and the stator 21 or its inner circumferential face IM is set. It can be seen in the case of a direct comparison of the two figures that the spacing Y2 from FIG. 6 is greater than the spacing Y1 from FIG. 5.

Accordingly, the actuating mechanism 5 has set the spacing Y2 between the respective centroid W of the respective pole arrangement 2, 3, 4 or its or the rotor bodies 11, 12 and the stator 21 or its inner circumferential face IM in such a way that the pole arrangements 2, 3, 4 have been moved to the inside toward the rotational axis D of the rotor 1. In other words, the pole arrangements 2, 3, 4 have been moved in the radial direction R to the inside toward the rotational axis D.

Furthermore, it can be gathered from FIGS. 5 and 6 that the stator 21 comprises a plurality of stator pole arrangements 22 for generating a magnetic field. Here, each stator pole arrangement 22 comprises a stator tooth with windings which can be energized differently, with the result that different magnetic poles or even no magnetic pole can be generated in a stator tooth. It is also possible that a rotor 1 which is of similar configuration according to FIG. 3 but, instead of the mass 10 which can be accelerated, likewise comprises magnetic and magnetizable rotor bodies 11, 12, is placed within the stator 22. In a case of this type, the rotor 1 then therefore has in each case one locking device 14 for the pole arrangement 2, 3, 4, the locking device 14 comprising a first and a second actuating position. The actuating positions are capable of locking the pole arrangements 2, 3, 4 at different distances from the rotational axis D or the inner circumferential face IM of the stator 21.

In order to move the pole arrangements 2, 3, 4 into a corresponding position or distance, an opposing electromagnetic field with respect to the electromagnetic field of the pole arrangements 2, 3, 4 of the rotor 1 can be generated by the stator pole arrangements 22 within a definable time interval. As a result, after release of the locked pole arrangements 2, 3, 4 in the first actuating position, they can be displaced in accordance with the forces which are generated by the electromagnetic fields, and can be locked at the second actuating position.

REFERENCE NUMERALS

1 Rotor
2 Pole arrangement
3 Pole arrangement
4 Pole arrangement
5 Actuating mechanism
6 Actuator
7 Lever arrangement
8 First lever arm
9 Second lever arm
10 Lever mass which can be accelerated
11 Rotor body, permanent magnet
12 Rotor body, laminated core
13 Cutout
14 Locking device
20 Electric machine
21 Stator
22 Stator pole arrangement
A Axial direction
AM Outer circumferential face
D Rotational axis
IM Inner circumferential face
L Air gap
N First/magnetic pole
P Pivot point
R Radial direction
S First/magnetic pole
T Tangential direction
U Circumferential direction
V Second/magnetizable pole
W Centroid
X Spacing between the outer circumferential face and the centroid
Y Spacing between the centroid of a pole arrangement and the inner circumferential face of the stator

The invention claimed is:

1. An internal rotor for an electric machine, comprising:
a rotational axis;
an outer circumferential face which delimits the internal rotor;
a pole arrangement comprising a centroid and a pivot; and
an actuating mechanism for pivoting the pole arrangement about the pivot and towards the rotational axis or away from the rotational axis to set a first spacing between the outer circumferential face and the centroid.

2. The internal rotor of claim 1, wherein:
the actuating mechanism comprises an actuator for pivoting the pole arrangement; and
the actuator comprises a hydraulically operable piston; the actuator comprises a pneumatically operable piston; the actuator comprises an electric motor actuator; or the actuator converts an axial force to a radial force.

3. The internal rotor of claim 1, wherein:
the actuating mechanism is operatively connected to the pole arrangement; and
the actuating mechanism is arranged between the rotational axis and the pole arrangement; or
the actuating mechanism is arranged between the outer circumferential face and the pole arrangement.

4. The internal rotor of claim 1, wherein:
the actuating mechanism comprises:
an actuator with a direction of action; and
an elastic element that counteracts the actuator to reset the pole arrangement counter to the direction of action; and
the actuator and the elastic element are arranged on opposite sides of the pole arrangement.

5. The internal rotor of claim 1, wherein:
the actuating mechanism comprises a lever arrangement;
the pole arrangement comprises a rotor body with a rotor body mass;
the lever arrangement comprises:
a lever mass that can be accelerated;
a first lever arm connecting the pivot to the rotor body and comprising a first length;
a second lever arm connecting the pivot to the lever mass and comprising a second length;
the pole arrangement can be pivoted about the pivot by the lever arrangement; and
the first length, the second length, the rotor body mass, and the lever mass are selected such that, when a definable rotational speed of the internal rotor is reached:
the lever mass is moved away from the rotational axis to the outside and the pole arrangement pivots about the pivot towards the rotational axis to the inside; or
the lever mass is moved towards the rotational axis to the inside and the pole arrangement pivots about the pivot away from the rotational axis to the outside.

6. The internal rotor of claim 1, further comprising a locking device for the pole arrangement, wherein:
the actuating mechanism comprises:
a force transmission device; and
an actuating device for moving the pole arrangement;
the actuating device can be activated by a force from the force transmission device to move the pole arrangement; and
the locking device comprises:
a first actuating position arranged to lock the pole arrangement at a first distance from the rotational axis; and a second actuating position arranged to lock the pole arrangement at a second distance from the rotational axis, different than the first distance.

7. The internal rotor of claim 1, further comprising:
a first plurality of pole arrangements comprising first magnetic poles N; and
a second plurality of pole arrangements comprising second magnetic poles S, alternating with the first plurality of pole arrangements in a circumferential direction, wherein
at least one of the first plurality of pole arrangements or the second plurality of pole arrangements comprises a magnetic rotor body with a permanent magnet or a magnetizable rotor body with a laminated core;
the magnetic rotor body or the magnetizable rotor body comprises a rod-shaped, cuboid configuration; and
at least two of the first plurality of pole arrangements or the second plurality of pole arrangements form a V-shaped arrangement or a spoke arrangement or are embedded in a flat manner into the internal rotor.

8. The internal rotor of claim 1, further comprising:
a cutout configured in cross section as a circle segment or as a rectangle; and
a magnetic rotor body or a magnetizable rotor body arranged within the cutout and movable within the cutout.

9. An electric machine comprising:
the internal rotor of claim 1; and
a stator comprising an inner circumferential face surrounding the internal rotor, wherein:
the internal rotor and the stator are spaced apart from one another in a radial direction to form an air gap between the two; and
moving the pole arrangement towards the rotational axis or away from the rotational axis also sets a second spacing between the centroid and the inner circumferential face.

10. The electric machine of claim 9, wherein:
the stator comprises a stator pole arrangement;
the internal rotor comprises a locking device for the pole arrangement;
the locking device comprises:
a first actuating position arranged to lock the pole arrangement at a first distance from the rotational axis; and
a second actuating position arranged to lock the pole arrangement at a second distance from the rotational axis, different than the first distance.

11. The electric machine of claim 10, wherein, to move the pole arrangement from the first actuating position to the second actuating position:
the locking device is released from the first actuating position;
the stator pole arrangement generates a first magnetic field opposing a second magnetic field of the pole arrangement within a definable time interval to displace the pole arrangement; and
the locking device is engaged in the second actuating position to lock the pole arrangement.

12. An internal rotor for an electric machine, comprising:
a rotational axis;
an outer circumferential face which delimits the internal rotor;
a pole arrangement comprising a centroid; and
an actuating mechanism for moving the pole arrangement towards the rotational axis or away from the rotational axis to set a first spacing between the outer circumferential face and the centroid, wherein:
the actuating mechanism comprises:
an actuator with a direction of action; and
an elastic element that counteracts the actuator to reset the pole arrangement counter to the direction of action; and
the actuator and the elastic element are arranged on opposite sides of the pole arrangement.

13. An electric machine comprising:
an internal rotor comprising
a rotational axis;
an outer circumferential face which delimits the internal rotor;
a pole arrangement comprising a centroid; and
an actuating mechanism for moving the pole arrangement towards the rotational axis or away from the rotational axis to set a first spacing between the outer circumferential face and the centroid; and
a stator comprising an inner circumferential face surrounding the internal rotor, wherein:
the internal rotor and the stator are spaced apart from one another in a radial direction to form an air gap between the two;
moving the pole arrangement towards the rotational axis or away from the rotational axis also sets a second spacing between the centroid and the inner circumferential face;
the stator comprises a stator pole arrangement;
the internal rotor comprises a locking device for the pole arrangement;
the locking device comprises:
a first actuating position arranged to lock the pole arrangement at a first distance from the rotational axis; and
a second actuating position arranged to lock the pole arrangement at a second distance from the rotational axis, different than the first distance.

14. The electric machine of claim 13, wherein, to move the pole arrangement from the first actuating position to the second actuating position:
the locking device is released from the first actuating position;
the stator pole arrangement generates a first magnetic field opposing a second magnetic field of the pole arrangement within a definable time interval to displace the pole arrangement; and
the locking device is engaged in the second actuating position to lock the pole arrangement.

* * * * *